United States Patent
Kondo et al.

(10) Patent No.: US 9,544,087 B2
(45) Date of Patent: Jan. 10, 2017

(54) AMPLIFYING DEVICE, RECEIVING DEVICE, AND AMPLIFICATION METHOD

(71) Applicant: FUJITSU LIMITED, Kawasaki-shi, Kanagawa (JP)

(72) Inventors: Yoshihisa Kondo, Yokohama (JP); Toshihiro Ohtani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/721,514

(22) Filed: May 26, 2015

(65) Prior Publication Data
US 2015/0365187 A1    Dec. 17, 2015

(30) Foreign Application Priority Data
Jun. 12, 2014   (JP) .................................. 2014-121625

(51) Int. Cl.
*H04J 14/02* (2006.01)
*H04B 10/079* (2013.01)
*H04B 10/67* (2013.01)

(52) U.S. Cl.
CPC ..... *H04J 14/0221* (2013.01); *H04B 10/07955* (2013.01); *H04B 10/673* (2013.01)

(58) Field of Classification Search
USPC ......................................................... 398/38
See application file for complete search history.

(56) References Cited

U.S. PATENT DOCUMENTS

| 6,522,796 B1 * | 2/2003 | Ziari | G02B 6/105 |
| | | | 359/341.3 |
| 2004/0190121 A1 * | 9/2004 | Popov | H04B 10/2916 |
| | | | 359/337 |
| 2012/0128351 A1 | 5/2012 | Yuki et al. | |

FOREIGN PATENT DOCUMENTS

| JP | 9-211398 | 8/1997 |
| JP | 2003-185852 | 7/2003 |
| JP | 2012-114639 | 6/2012 |

* cited by examiner

*Primary Examiner* — David Payne
*Assistant Examiner* — Omar S Ismail
(74) *Attorney, Agent, or Firm* — Staas & Halsey LLP

(57) ABSTRACT

An amplifying device includes a light source configured to output excitation light, a depolarizer configured to change a degree of polarization of the excitation light in accordance with a setting, an amplifier configured to execute Raman amplification so as to amplify a polarized multiplexed optical signal by the excitation light of which the degree of the polarization has been changed by the depolarizer, a measurer configured to measure the power of a plurality of polarized light components multiplexed into the polarized multiplexed optical signal subjected to the Raman amplification and amplified by the excitation light, and an adjuster configured to calculate differences between the power of the plurality of polarized light components and adjust the setting of the depolarizer so as to reduce the differences between the power of the plurality of polarized light components.

12 Claims, 7 Drawing Sheets

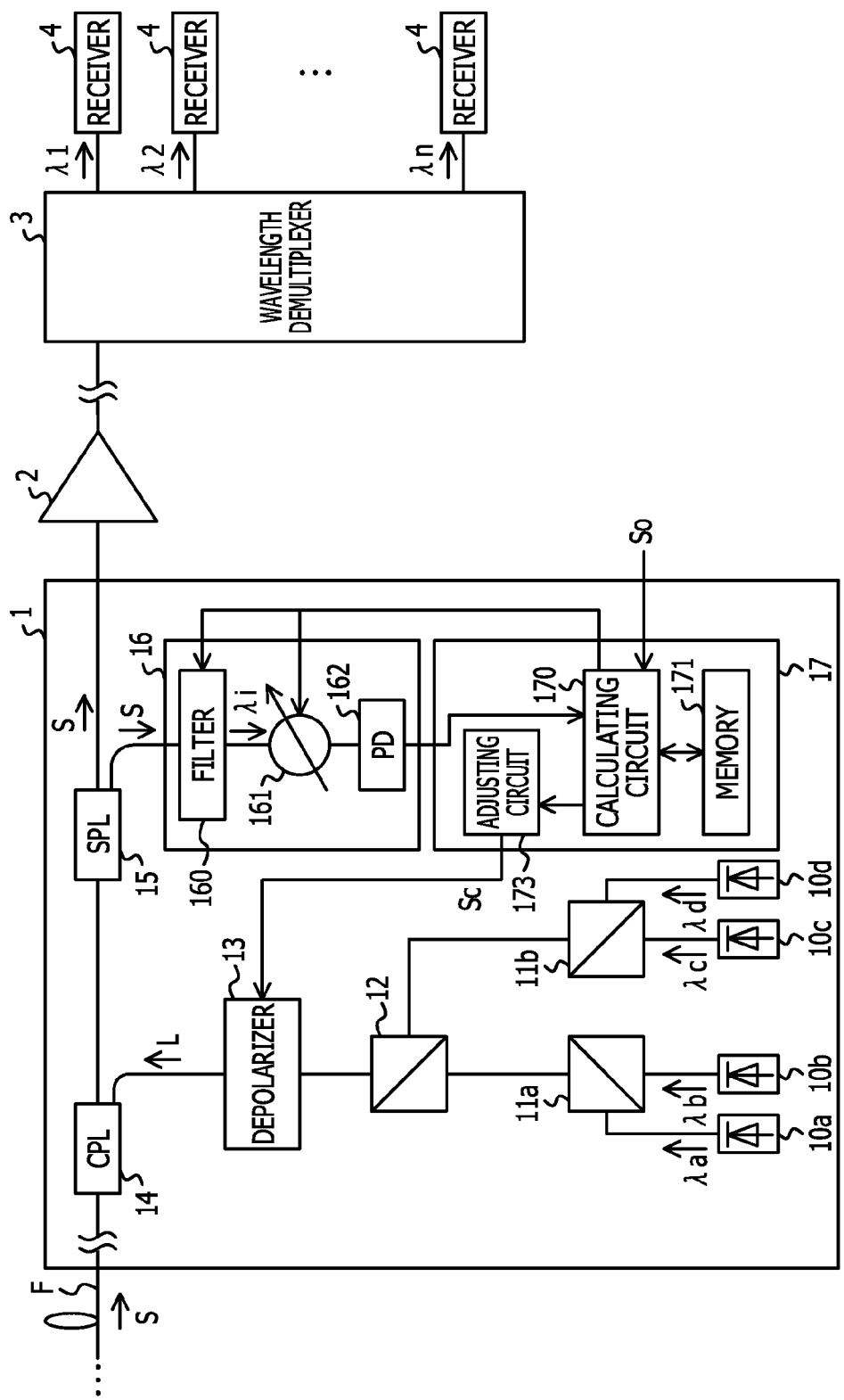

FIG. 3

| SETTING OF DEPOLARIZER | WAVELENGTH | DIFFERENCE $\Delta Pi$ BETWEEN POWER | AVERAGE $\Delta Pave$ |
|---|---|---|---|
| 0 | $\lambda 1$<br>$\lambda 2$<br>$\vdots$<br>$\lambda n$ | X10<br>X20<br>$\vdots$<br>Xn0 | X0 |
| 1 | $\lambda 1$<br>$\lambda 2$<br>$\vdots$<br>$\lambda n$ | X11<br>X21<br>$\vdots$<br>Xn1 | X1 |
| 2 | $\lambda 1$<br>$\lambda 2$<br>$\vdots$<br>$\lambda n$ | X12<br>X22<br>$\vdots$<br>Xn2 | X2 |
| $\vdots$ | $\vdots$ | $\vdots$ | $\vdots$ |

AMPLIFYING DEVICE, RECEIVING DEVICE, AND AMPLIFICATION METHOD

CROSS-REFERENCE TO RELATED APPLICATION

This application is based upon and claims the benefit of priority of the prior Japanese Patent Application No. 2014-121625, filed on Jun. 12, 2014, the entire contents of which are incorporated herein by reference.

FIELD

The embodiments discussed herein are related to an amplifying device, a receiving device, and an amplification method.

BACKGROUND

With increasing demands for communication, a wavelength division multiplexing (WDM) transmission technique that uses a digital coherent optical transmission scheme and achieves a transmission rate of, for example, 100 Gps for light with a single wavelength is being actively researched and developed. For the digital coherent optical transmission scheme, multilevel modulation such as dual polarization (DP)-quadrature phase shift keying (QPSK) using a polarization division multiplexing scheme is used in order to achieve a high transmission rate.

In addition, a receiving device that uses the digital coherent optical transmission scheme not only includes an amplifier provided with an erbium doped fiber (EDF), but also amplifies a polarized multiplexed optical signal by a Raman amplifier in order to secure an optical level sufficient for a reception process. It is preferable that the power of polarized light components of the polarized multiplexed optical signal be uniform in order to improve reception performance of the receiving device. The power of the polarized light components is not uniform due to polarization dependent losses (PDLs) of an optical fiber of a transmission path and an optical part existing on the transmission path and a polarization dependent gain (PDG) occurred due to Raman amplification.

The polarization dependent gain occurs based on a relationship between the polarized multiplexed optical signal and a polarization state of excitation light to be used for Raman amplification executed on the polarized multiplexed optical signal. For example, if the excitation light is a linearly-polarized wave, and one of polarized light components of the polarized multiplexed optical signal is parallel to a polarized component of the excitation light, the polarized light component causes an increase in an amplification gain, but the other polarized light component is not parallel to the polarized component of the excitation light and causes a reduction in the amplification gain.

Thus, in order to reduce the polarization dependent gain, a depolarizer configured to reduce a degree of the polarization (DOP) of the excitation light is used. This technique is disclosed in, for example, Japanese Laid-open Patent Publication No. 2003-185852. The degree of the polarization is a value in a range of 0 to 1. If the polarization state is completely destabilized (randomized), the degree of the polarization represents 0. If the polarization state is completely maintained at a certain level, the degree of the polarization represents 1. Specifically, the excitation light is depolarized by passing through the depolarizer.

The depolarizer has a polarization maintaining fiber of which the length (of, for example, several tens of meters to several hundreds of meters) is optimally adjusted based on characteristics of a light source of the excitation light. Thus, the degree of the polarization of the excitation light is not sufficiently reduced (for example, a range of 0.1 to 0.15) depending on the polarization dependent loss of the transmission path and the quality of communication is reduced.

SUMMARY

According to an aspect of the invention, an amplifying device includes a light source configured to output excitation light, a depolarizer configured to change a degree of polarization of the excitation light in accordance with a setting, an amplifier configured to execute Raman amplification so as to amplify a polarized multiplexed optical signal by the excitation light of which the degree of the polarization has been changed by the depolarizer, a measurer configured to measure the power of a plurality of polarized light components multiplexed into the polarized multiplexed optical signal subjected to the Raman amplification and amplified by the excitation light, and an adjuster configured to calculate differences between the power of the plurality of polarized light components and adjust the setting of the depolarizer so as to reduce the differences between the power of the plurality of polarized light components.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a configuration diagram illustrating a receiving device according to an embodiment;

FIG. 3 is a table illustrating an example of a data table;

DESCRIPTION OF EMBODIMENTS

Figure 2A:
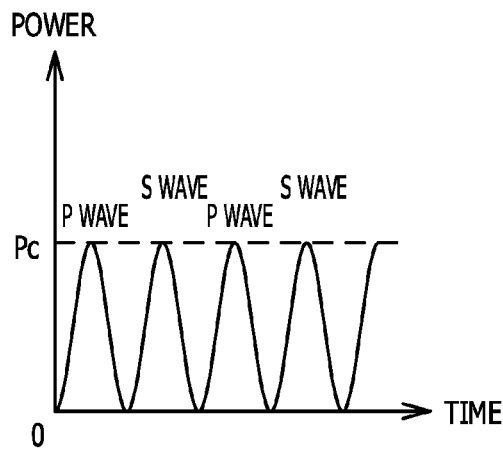
FIGS. 2A to 2D are graphs illustrating examples of detected waveforms of power.

FIG. 1 is a configuration diagram illustrating a receiving device according to an embodiment. The receiving device receives a polarized multiplexed optical signal S. The polarized multiplexed optical signal S is transmitted by a digital coherent optical transmission scheme, for example. The polarized multiplexed optical signal S is multiplexed light obtained by executing wavelength multiplexing on optical signals with different wavelengths λ1 to λn. Each of the optical signals is generated by polarizing and multiplexing a P wave and an S wave that are two polarized light components orthogonal to each other. The polarized multiplexed optical signal S, however, is not limited to this and may include only an optical signal with a single wavelength.

The receiving device includes a Raman amplifier (amplifying device) 1, an optical amplifier 2, a wavelength demultiplexer 3, and a plurality of receivers (receivers) 4. The Raman amplifier 1 and the optical amplifier 2 are installed on a transmission path (optical fiber) F of the polarized multiplexed optical signal S and configured to amplify the polarized multiplexed optical signal S. The Raman amplifier 1 uses stimulated Raman scattering to amplify the light, while the optical amplifier 2 uses an EDF to amplify the light. Thus, the polarized multiplexed optical signal S is amplified so as to have an optical level sufficient for a reception process.

The wavelength demultiplexer 3 demultiplexes the polarized multiplexed optical signal S into the optical signals with the wavelengths $\lambda 1$ to $\lambda n$ and outputs the optical signals to the plurality of receivers 4. The receivers 4 receive the optical signals with the wavelengths $\lambda 1$ to $\lambda n$, respectively.

The Raman amplifier 1 improves the quality of communication by executing Raman amplification so as to amplify the polarized multiplexed optical signal S while suppressing a polarization dependent gain, as described later. The Raman amplifier 1 includes excitation light sources (light sources) 10a to 10d, polarized light multiplexers 11a and 11b, a first wavelength multiplexer 12, a depolarizer 13, a second wavelength multiplexer (coupler (CPL)) (amplifier) 14, a splitter (SPL) 15, a measurer 16, and an adjuster 17.

The excitation light sources 10a to 10d output linearly-polarized light with wavelengths $\lambda a$ to $\lambda d$. The wavelengths $\lambda a$ and $\lambda b$ are values close to each other, while the wavelengths $\lambda c$ and $\lambda d$ are values close to each other.

The polarized light multiplexer 11a polarizes and multiplexes the light output from the excitation light sources 10a and 10b. The polarized light multiplexer 11b polarizes and multiplexes the light output from the excitation light sources 10c and 10d. The first wavelength multiplexer 12 multiplexes the light multiplexed by the polarized light multiplexers 11a and 11b and thereby generates excitation light L.

The generated excitation light L includes two light components having different wavelengths and polarized orthogonal to each other. Thus, the degree of the polarization of the excitation light L immediately after the generation is 1.

The generated excitation light L is input to the depolarizer 13. The depolarizer 13 changes the degree of the polarization of the excitation light L in accordance with a setting of the depolarizer 13. The depolarizer 13 is a bulk depolarizer configured to receive a control signal Sc adjusted for an adjustment terminal of the depolarizer 13 from an adjusting circuit 173 (described later) and change the degree of the polarization based on the control signal Sc in a different manner from a depolarizer provided with a polarization maintaining fiber.

The excitation light L reduces the degree of the polarization (DOP) of the excitation light L by passing through the depolarizer 13. Specifically, a polarization state of the excitation light L is destabilized (randomized) by the depolarizer 13.

The excitation light L that has passed through the depolarizer 13 is input to the second wavelength multiplexer 14. The second wavelength multiplexer 14 executes Raman amplification so as to amplify the polarized multiplexed optical signal S by the excitation light L of which the degree of the polarization has been changed by the depolarizer 13.

The second wavelength multiplexer 14 is connected to a transmission path F. The second wavelength multiplexer 14 multiplexes the polarized multiplexed optical signal S received from the transmission path F with the excitation light received from the depolarizer 13 and thereby amplifies the polarized multiplexed optical signal S. In the second wavelength multiplexer 14, the polarized multiplexed optical signal S is amplified by the excitation light L due to the stimulated Raman scattering.

The amplified polarized multiplexed optical signal S passes through the splitter 15 and is received by the receivers 4. The splitter 15 splits the power of the polarized multiplexed optical signal S and outputs the polarized multiplexed optical signal S to the optical amplifier 2 and the measurer 16.

In the aforementioned configuration, if the excitation light L generated by the first wavelength multiplexer 12 does not pass through the depolarizer 13 and is input to the second wavelength multiplexer 14, the excitation light L has the two polarized light components orthogonal to each other. Thus, a state in which polarization states of the polarized light components of the excitation light L match polarization states of the polarized multiplexed optical signal S, and a state in which the polarization states of the polarized light components of the excitation light L do not match the polarization states of the polarized multiplexed optical signal S, are randomly repeated, and the power of the polarized light components of the polarized multiplexed optical signal S to be input to the receivers 4 fluctuates. Thus, in this case, the polarization dependent gain increases and the reception performance of the receiving device is reduced.

In the aforementioned configuration, if the depolarizer 13 is a polarization maintaining fiber with a predetermined length, the depolarizer 13 does not change the degree of the polarization of the excitation light L. In this case, the degree of the polarization of the excitation light L may not be sufficiently reduced depending on a polarization dependent loss of the transmission path F, and the quality of communication may be reduced.

Thus, the Raman amplifier 1 measures the power of the polarized light components of the polarized multiplexed optical signal S subjected to the Raman amplification and amplified by the excitation light L, adjusts the setting of the depolarizer 13 configured to change the degree of the polarization of the excitation light L so as to reduce differences between the power of the polarized light components, and thereby improves the quality of communication. The power of the polarized light components is measured by the measurer 16, and the setting of the depolarizer 13 is adjusted by the adjuster 17. As described later, the Raman amplifier 1 uses the measurer 16 and the adjuster 17 to execute feedback control on the depolarizer 13.

The measurer 16 includes a filter 160, an analyzer 161, and a photo detector (PD) 162. A wavelength band of the filter 160 is tunable. The filter 160 extracts, from the polarized multiplexed optical signal S, an optical signal with a wavelength $\lambda i$ (i=1, 2, . . . , n) instructed by the adjuster 17.

The analyzer 161 is, for example, a deflecting plate and extracts a polarized light component from the optical signal by rotating a slit at a certain angular rate by 360 degrees in accordance with the instruction from the adjuster 17. The PD 162 detects the strength of the polarized light component by converting the polarized light component extracted by the analyzer 161 into an electric signal.

In this manner, the measurer 16 measures the power of the polarized light components (P waves and S waves) multiplexed into the polarized multiplexed optical signal S subjected to the Raman amplification and thereby amplified by the excitation light L. FIGS. 2A to 2D illustrate examples of detected waveforms of the power.

In FIGS. 2A to 2D, abscissae represent time (an angle of the analyzer 161), and ordinates represent the power of polarized light components. The waveforms of the P and S waves alternately appear on time axes due to the rotation of the analyzer 161.

FIG. 2A illustrates an ideal detected waveform. The power Pc of the P waves and the power Pc of the S waves are ideally equal to each other. In this case, the balance of the power of the polarized light components in the receivers 4 is optimized, and the reception performance of the receiving device is improved.

Figure 2B:
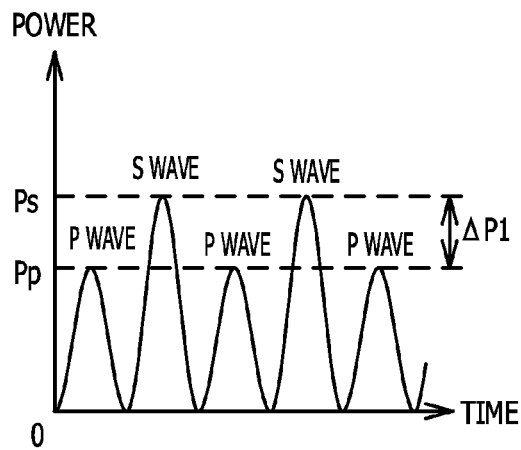
Figure 2C:
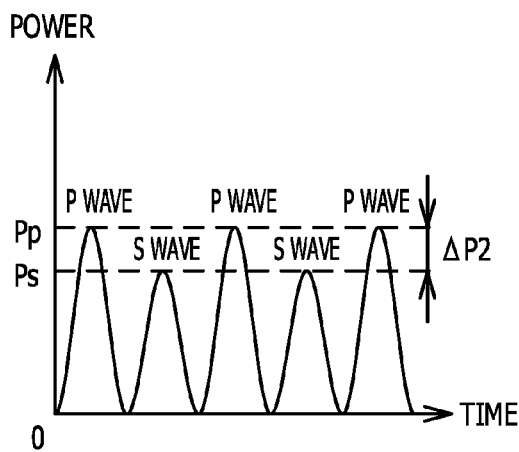
Figure 2D:
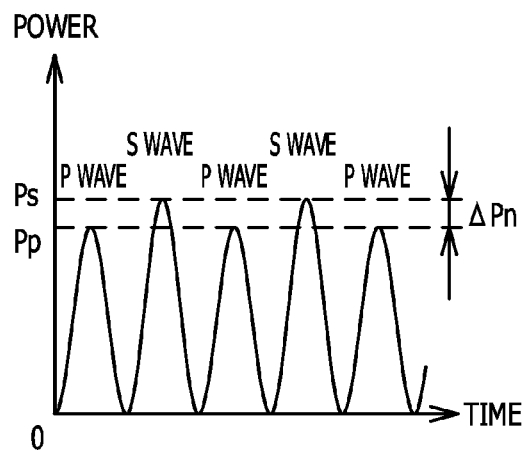

As described above, however, the power Pp of the P waves and the power Ps of the S waves are not equal to each other due to the aforementioned polarization dependent gain occurred due to the Raman amplification, the polarization dependent loss of the transmission path F and a polarization dependent loss of an optical part existing on the transmission path F, as illustrated in FIGS. 2B to 2D. In addition, the power Pp of the P waves and the power Ps of the S waves vary depending on characteristics of the wavelengths $\lambda 1$ to $\lambda n$.

The adjuster 17 calculates differences $\Delta P1$ to $\Delta Pn$ between the power Pp and Ps of the P and S waves for the wavelengths $\lambda 1$ to $\lambda n$ and adjusts the setting of the depolarizer 13 so as to reduce the differences $\Delta P1$ to $\Delta Pn$ between the power of the polarized light components.

The adjuster 17 includes a calculating circuit 170, a memory 171, and an adjusting circuit 173. The calculating circuit 170 and the adjusting circuit 173 are digital signal processors (DSPs), for example.

The calculating circuit 170 executes a process of adjusting the depolarizer 13 and controls the adjusting circuit 173, the filter 160, and the analyzer 161. Specifically, the calculating circuit 170 instructs the filter 160 to select the wavelengths $\lambda i$ and controls the rotation of the analyzer 161. The calculating circuit 170 acquires information (hereinafter referred to as wavelength information) of the wavelengths $\lambda i$ included in the polarized multiplexed optical signal S and the number of the wavelengths based on a setting signal So received from, for example, a network management device.

The calculating circuit 170 instructs the adjusting circuit 173 to adjust the setting of the depolarizer 13. The adjusting circuit 173 generates a control signal Sc based on the instructed setting and outputs the control signal Sc to the adjustment terminal of the depolarizer 13.

The calculating circuit 170 calculates, based on the results of the measurement by the measurer 16, the differences $\Delta Pi$ between the power of the polarized light components (P waves and S waves) for settings of the depolarizer 13 and causes the calculated differences to be recorded in a data table held in the memory 171. FIG. 3 illustrates an example of the data table.

In the data table, the differences $\Delta Pi$ between the power corresponding to the wavelengths $\lambda 1$ to $\lambda n$ are recorded for the settings (states "0", "1", "2", . . . ) of the depolarizer 13. For example, the differences $\Delta Pi$ between the power corresponding to the wavelengths $\lambda 1$ to $\lambda n$ when the state of the depolarizer 13 is set to "0" are X10 to Xn0. The differences $\Delta Pi$ between the power corresponding to the wavelengths $\lambda 1$ to $\lambda n$ are calculated based on the power Pp and Ps of the P and S waves according to the following Equation (1), for example.

$$\Delta Pi = |Pp - Ps|/Po \tag{1}$$

Po is smaller power among the power Pp and Ps of P and S waves. Specifically, the differences $\Delta Pi$ between the power are calculated as ratios of the power. Thus, even if transmission distances of the optical signals with the wavelengths $\lambda 1$ to $\lambda n$ are different, the differences $\Delta Pi$ between the power are calculated using the same standard, regardless of what the differences between the power of the optical signals are.

In addition, the calculating circuit 170 calculates averages $\Delta Pave$ of the differences $\Delta Pi$ between the power of the polarized multiplexed light components with the wavelengths $\lambda 1$ to $\lambda n$ and causes the calculated averages $\Delta Pave$ to be recorded in the data table. In the data table, the averages $\Delta Pave$ are recorded for the settings of the depolarizer 13. In the example, the averages $\Delta Pave$ in the states "0", "1", and "2" are X0, X1, and X2. The averages $\Delta Pave$ are calculated according to the following Equation (2) using the differences $\Delta Pi$ of the power of the optical signals with the wavelengths $\lambda i$, for example.

$$\Delta Pave = (\Delta P1 + \Delta P2 + \Delta P3 + \ldots + \Delta Pn)/n \tag{2}$$

Specifically, the average $\Delta Pave$ of differences $\Delta Pi$ between the power of the polarized multiplexed light components with the wavelengths $\lambda i$ is calculated by dividing a value obtained by summing the differences $\Delta Pi$ between the power of the optical signals with the wavelengths $\lambda i$ by the number n of the wavelengths for each setting of the depolarizer 13. If a wavelength among the wavelengths $\lambda 1$ to $\lambda n$ is not used, the difference $\Delta Pi$ between the power of optical signals with the interested wavelength is not acquired and not used for the calculation of the averages $\Delta Pave$. In this case, the difference $\Delta Pi$ between the power of the optical signals with the interested wavelength is recorded as "None" in the data table, for example.

The calculating circuit 170 calculates the averages $\Delta Pave$ for the settings of the depolarizer 13 and instructs the adjusting circuit 173 to select a setting of the depolarizer 13 so as to ensure that the average $\Delta Pave$ for the setting is minimal. The adjusting circuit 173 generates a control signal Sc based on the setting instructed by the calculating circuit 170 and outputs the control signal Sc to the adjustment terminal of the depolarizer 13. The depolarizer 13 changes the degree of the polarization of the excitation light L in accordance with the control signal Sc. Thus, the degree of the polarization of the excitation light L is sufficiently reduced and the quality of communication is improved.

In the aforementioned manner, the adjuster 17 calculates the averages $\Delta Pave$ of the differences between the power of the polarized light components multiplexed into the optical signals and adjusts the setting of the depolarizer 13 so as to ensure that the average $\Delta Pave$ for the setting is minimal. Thus, if the polarized multiplexed optical signal S includes the plurality of optical signals with the wavelengths $\lambda 1$ to $\lambda n$, the depolarizer 13 may be set so as to ensure that the balance of the power of the polarized light components as the overall optical signal is improved regardless of variations in the differences $\Delta Pi$ between the power of the optical signals.

In the aforementioned configuration, the Raman amplifier 1 is installed on the upstream side of the optical amplifier 2. Thus, if an optical part included in the optical amplifier 2 has a polarization dependent loss, the polarization dependent loss may not be compensated for. Thus, the polarization dependent loss of the optical part included in the optical amplifier 2 may be compensated for by installing the measurer 16 and the adjuster 17 on the downstream side of the optical amplifier 2 in another embodiment described below.

Figure 4:
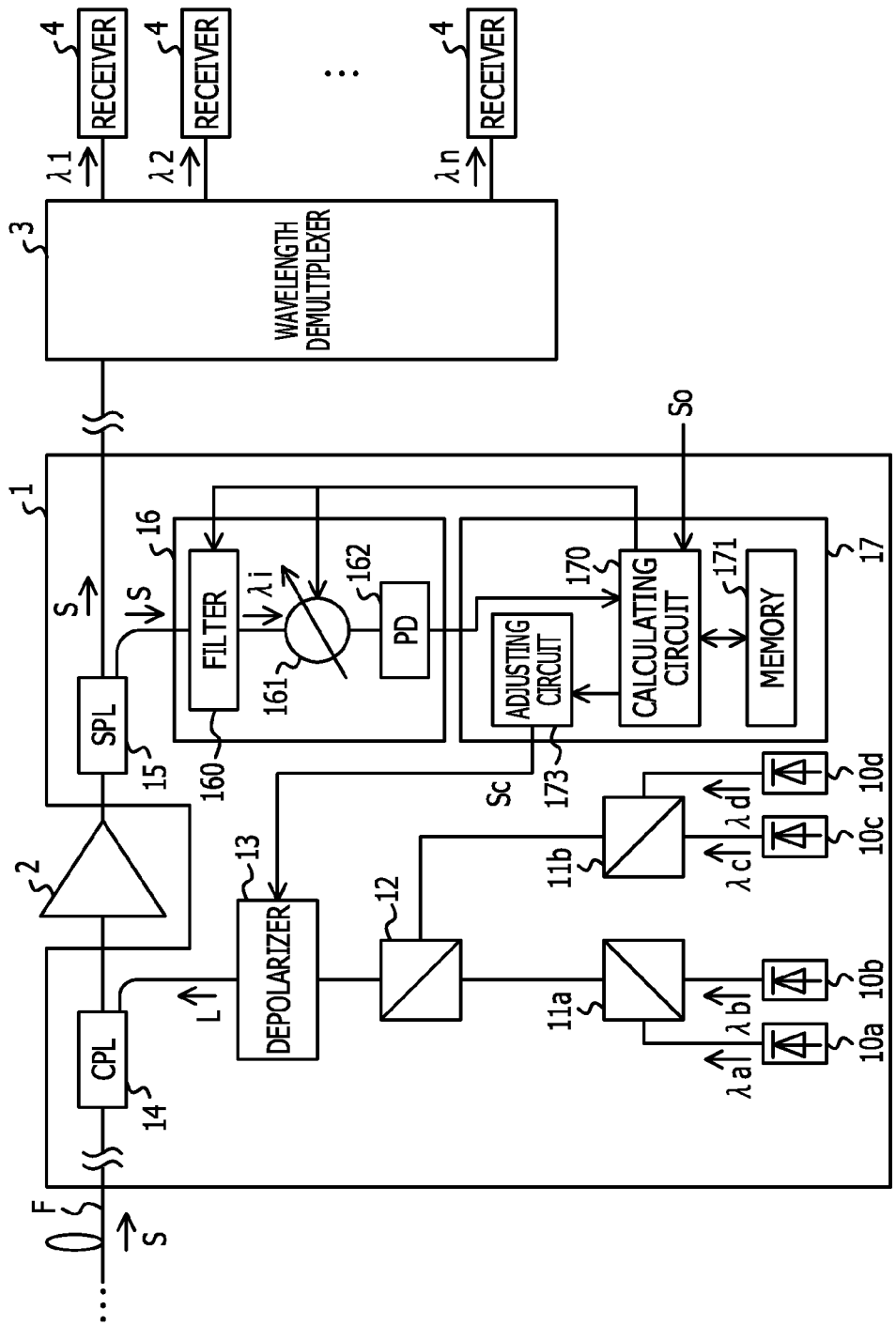
FIG. 4 is a configuration diagram illustrating the receiving device according to another embodiment.

FIG. 4 is a configuration diagram illustrating the receiving device according to the other embodiment. Configurations that are illustrated in FIG. 4 and common to FIG. 1 are represented by the same reference numerals and symbols as FIG. 1, and a description thereof is omitted.

The receiving device includes the Raman amplifier (amplifying device) 1, the optical amplifier 2, the wavelength demultiplexer 3, the plurality of receivers 4. The Raman amplifier 1 includes the excitation light sources 10a to 10d, the polarized light multiplexers 11a and 11b, the first wavelength multiplexer 12, the depolarizer 13, the second wavelength multiplexer (amplifier) 14, the splitter 15, the measurer 16, and the adjuster 17.

In the present embodiment, the optical amplifier 2 is installed on the transmission path F between the second wavelength multiplexer 14 and the splitter 15. Thus, the polarized multiplexed optical signal S subjected to the Raman amplification is input to the optical amplifier 2. The polarized multiplexed optical signal S amplified by the optical amplifier 2 is input to the splitter 15.

Thus, the polarized multiplexed optical signal S in which the polarization dependent loss of the optical part included in the optical amplifier 2 is reflected is input to the measurer 16. The measurer 16 measures the power of the polarized light components of the polarized multiplexed optical signal S amplified by the optical amplifier 2.

Thus, the adjuster 17 may adjust the setting of the depolarizer 13 so as to compensate for the polarization dependent loss of the optical part included in the optical amplifier 2.

In another embodiment described below, a polarization dependent loss on the transmission path extending to the receivers 4 may be compensated for by configuring the receiving device so as to ensure that the polarized multiplexed optical signal S to be received by the receivers 4 is input to the measurer 16.

Figure 5:
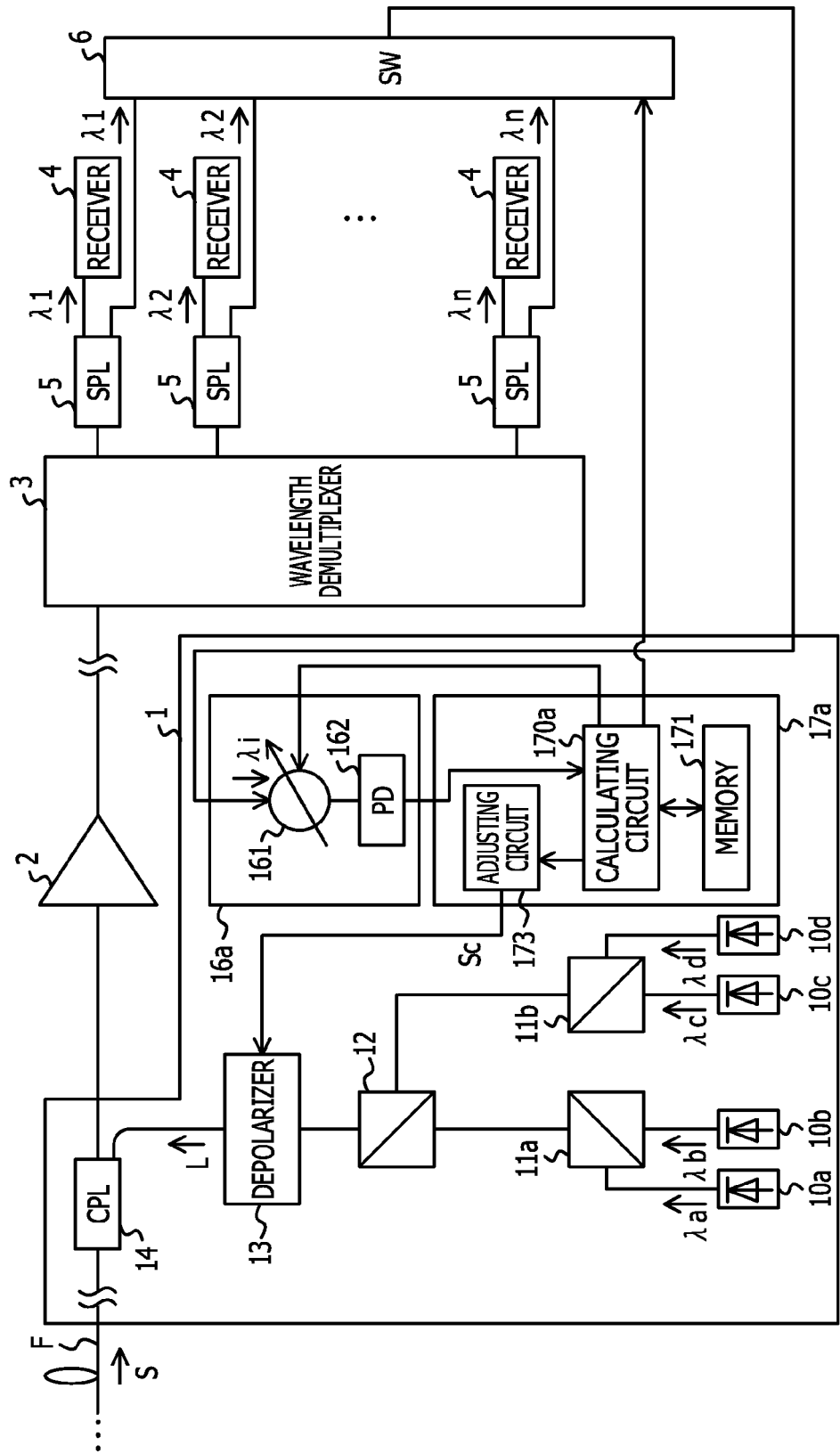
FIG. 5 is a configuration diagram illustrating the receiving device according to still another embodiment.

FIG. 5 is a configuration diagram illustrating the receiving device according to the other embodiment. Configurations that are illustrated in FIG. 5 and common to FIG. 1 are represented by the same reference numerals and symbols as FIG. 1, and a description thereof is omitted.

The receiving device includes the Raman amplifier (amplifying device) 1, the optical amplifier 2, the wavelength demultiplexer 3, the plurality of receivers 4, a plurality of splitters 5, and an optical switch 6. The Raman amplifier 1 includes the excitation light sources 10a to 10d, the polarized light multiplexers 11a and 11b, the first wavelength multiplexer 12, the depolarizer 13, the second wavelength multiplexer (amplifier) 14, a measurer 16a, and an adjuster 17a.

The optical amplifier 2 is connected to the second wavelength multiplexer 14 on the downstream side of the second wavelength multiplexer 14 and configured to amplify the polarized multiplexed optical signal S subjected to the Raman amplification. The polarized multiplexed optical signal S amplified by the optical amplifier 2 is input to the wavelength demultiplexer 3 and input to the splitter 5 as the optical signals with the wavelengths λ1 to λn.

The splitters 5 are optical splitters, for example. The splitters 5 split the power of the polarized multiplexed optical signal S and output the polarized multiplexed optical signal S to the receivers 4 and the optical switch 6. The optical switch 6 selects an optical signal with a wavelength λi instructed by the adjuster 17a from among the optical signals received from the splitters 5 and outputs the selected optical signal to the measurer 16a.

The measurer 16a includes the analyzer 161 and the photo detector (PD) 162. Specifically, in the present embodiment, the measurer 16a does not include the filter 160, unlike the aforementioned embodiments. The analyzer 161 extracts a polarized light component from the optical signal received from the optical switch 6 in accordance with the instruction from the adjuster 17a by rotating the split at the certain angular rate. The PD 162 detects the strength of the polarized light component by converting the polarized light component extracted by the analyzer 161 into an electric signal.

In the aforementioned manner, the measurer 16a measures the power of the polarized light components of the optical signals received from the optical switch 6. Specifically, the measurer 16a measures the power of the polarized light components multiplexed into the polarized multiplexed optical signal S amplified by the optical amplifier 2 in the same manner as the embodiment illustrated in FIG. 4.

The adjuster 17a includes a calculating circuit 170a, the memory 171, and the adjusting circuit 173. The calculating circuit 170a and the adjusting circuit 173 are DSPs, for example.

The calculating circuit 170a executes the process of adjusting the depolarizer 13 and controls the adjusting circuit 173, the optical switch 6, and the analyzer 161. Specifically, the calculating circuit 170a instructs the optical switch 6 to select a wavelength λi and controls the rotation of the analyzer 161.

In addition, the calculating circuit 170a instructs the adjusting circuit 173 to set the depolarizer 13. The adjusting circuit 173 generates a control signal Sc based on the instructed setting and outputs the control signal Sc to the adjustment terminal of the depolarizer 13.

Thus, the receiving device according to the present embodiment compensates for the polarization dependent loss on the transmission path extending to the receivers 4.

Next, the process of adjusting the setting of the depolarizer 13 by the aforementioned Raman amplifier 1 is described. The adjustment process is executed when the receiving device is activated, for example. Once the setting of the depolarizer 13 is adjusted, the polarization dependent loss of the transmission path F and the polarization dependent loss of the optical part existing on the transmission path almost do not change. Thus, the adjustment process is executed approximately once a day, for example.

Figure 6:
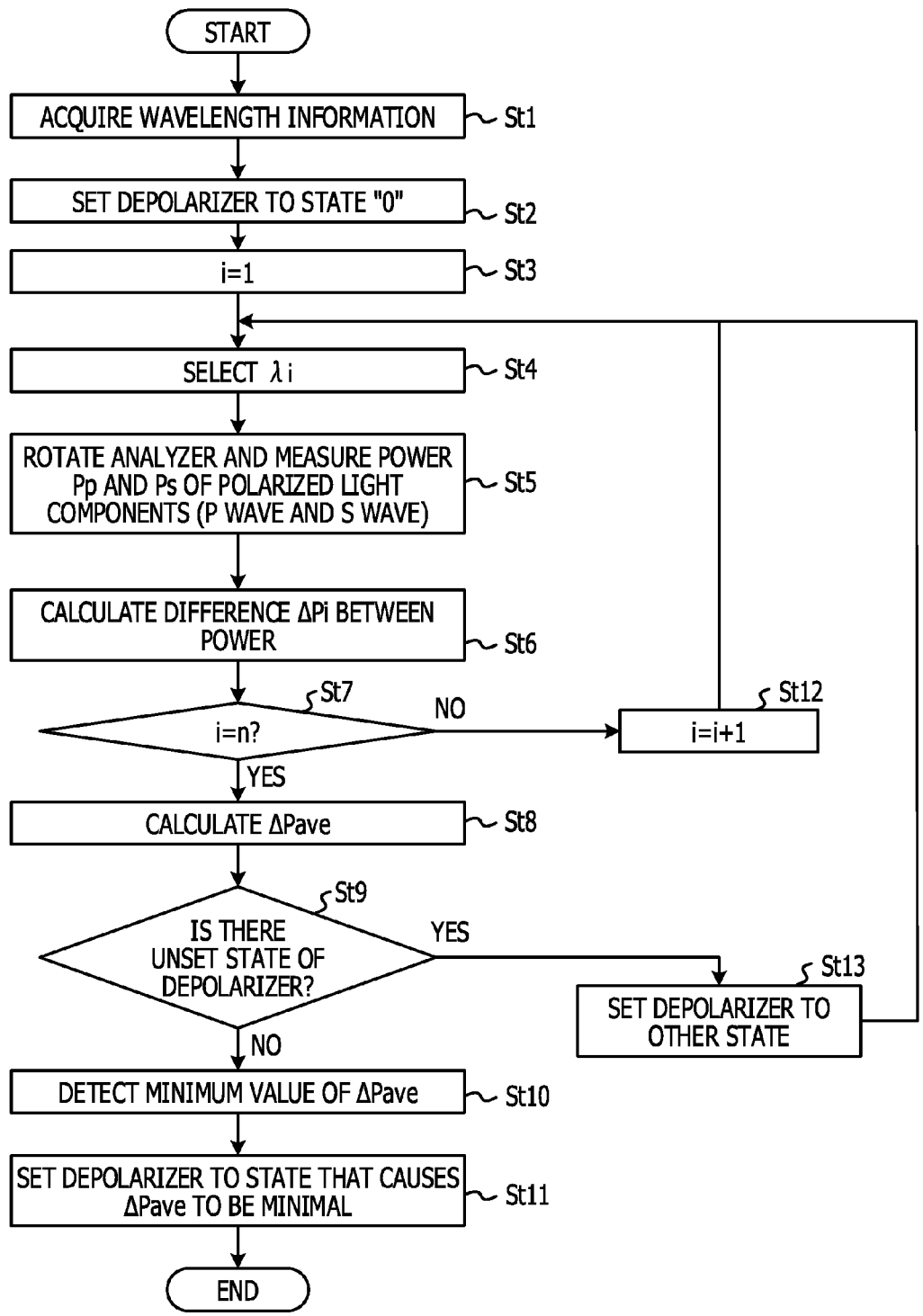
FIG. 6 is a flowchart of an example of a process of adjusting a setting of a depolarizer.

FIG. 6 is a flowchart of an example of the process of adjusting the setting of the depolarizer 13. First, the calculating circuit 170 or 170a acquires, from the network management device, the wavelength information on the wavelengths λ1 to λn included in the polarized multiplexed optical signal S (in step St1). The acquired wavelength information is recorded in the memory 171, for example.

Next, the calculating circuit 170 or 170a instructs the adjusting circuit 173 to set the depolarizer 13 to the state "0" (in step St2). Next, the calculating circuit 170 or 170a sets a variable i to 1 (in step St3). In this case, the calculating circuit 170 illustrated in FIGS. 1 and 4 notifies the filter 160 of the variable i, or the calculating circuit 170a illustrated in FIG. 5 notifies the optical switch 6 of the variable i.

Next, the filter 160 or the optical switch 6 selects a wavelength λi based on the notified variable i (in step St4). Then, the calculating circuit 170 or 170a rotates the analyzer 161 and the measurer 16 or 16a measures the power Pp and Ps of polarized light components (P wave and S wave) of the polarized multiplexed optical signal S (in step St5).

Next, the calculating circuit 170 or 170a uses the aforementioned Equation (1) to calculate the difference ΔPi between the power Pp and Ps based on the results of measuring the power Pp and Ps of the polarized light components (in step St6). The calculated difference ΔPi between the power Pp and Ps is recorded in the data table (refer to FIG. 3) within the memory 171.

Next, the calculating circuit 170 or 170a determines whether or not the variable i is equal to n (in step St7). In this case, n is the number of the wavelengths included in the polarized multiplexed optical signal S and is acquired from the wave information. If the variable i is not equal to n (No in step St7), the calculating circuit 170 or 170a sets the variable i to a value of (i+1) (in step St12). Specifically, the calculating circuit 170 or 170a notifies the filter 160 or the optical switch 6 of the value obtained by adding 1 to the variable i. After that, the processes of steps St4 to St6 are executed to calculate the differences ΔPi between the power Pp and Ps for the other wavelengths λ2 to λn.

If the variable i is equal to n (Yes in step St7), the calculating circuit 170 or 170a uses the aforementioned Equation (2) to calculate the average ΔPave of the differences ΔPi between the power Pp and Ps of the optical signals with the wavelengths λ1 to λn (in step St8). The calculated average ΔPave is recorded in the data table within the memory 171.

Next, the calculating circuit 170 or 170a determines whether or not there is an unset state of the depolarizer 13 (in step St9). If there is the unset state of the depolarizer 13 (Yes in step St9), the calculating circuit 170 or 170a instructs the adjusting circuit 173 to set the depolarizer 13 to the other state (unset state) (in step St13). After that, the processes of steps St4 to St8 are executed to calculate the averages ΔPave for the settings of the depolarizer 13.

On the other hand, if there is not the unset state of the depolarizer 13 (No in step St9), the calculating circuit 170 or 170a references the data table and detects the minimum value among the averages ΔPave (in step St10). Next, the calculating circuit 170 or 170a instructs the adjusting circuit 173 to set the depolarizer 13 to a state that causes the average ΔPave to be minimal (in step St11). In this manner, the process of adjusting the setting of the depolarizer 13 is executed.

In the aforementioned adjustment process, the Raman amplifier 1 may periodically measure only the power Pp and Ps of P and S waves of an optical signal of which the difference ΔPi between the power Pp and Ps is largest among the optical signals with the wavelengths λ1 to λn. In this case, not only when the difference ΔPi between the power Pp and Ps is larger than the difference ΔPi between the power Pp and Ps previously measured, but also when the difference ΔPi between the power Pp and Ps is smaller than the difference ΔPi between the power Pp and Ps previously measured, the Raman amplifier 1 executes the adjustment process. This is due to the fact that there is a possibility that the differences ΔPi between the power Pp and Ps, yet to be measured, of optical signals among the optical signals with the wavelengths λ1 to λn may increase.

If a new optical signal with a wavelength different from the plurality of optical signals is added to the polarized multiplexed optical signal S after the adjuster 17 or 17a adjusts the setting of the depolarizer 13, the measurer 16 or 16a may measure the power Pp and Ps of polarized light components multiplexed into the new optical signal. In this case, the adjuster 17 or 17a calculates the difference ΔPi between the power of the polarized light components of the new optical signal. If the difference ΔPi between the polarized light components of the new optical signal is not in a range between the maximum value ΔPmax and the minimum value ΔPmin among the differences between the power of the polarized light components of the optical signals for the setting of the adjusted depolarizer 13, the adjuster 17 or 17a readjusts the setting of the depolarizer 13.

Figure 7:
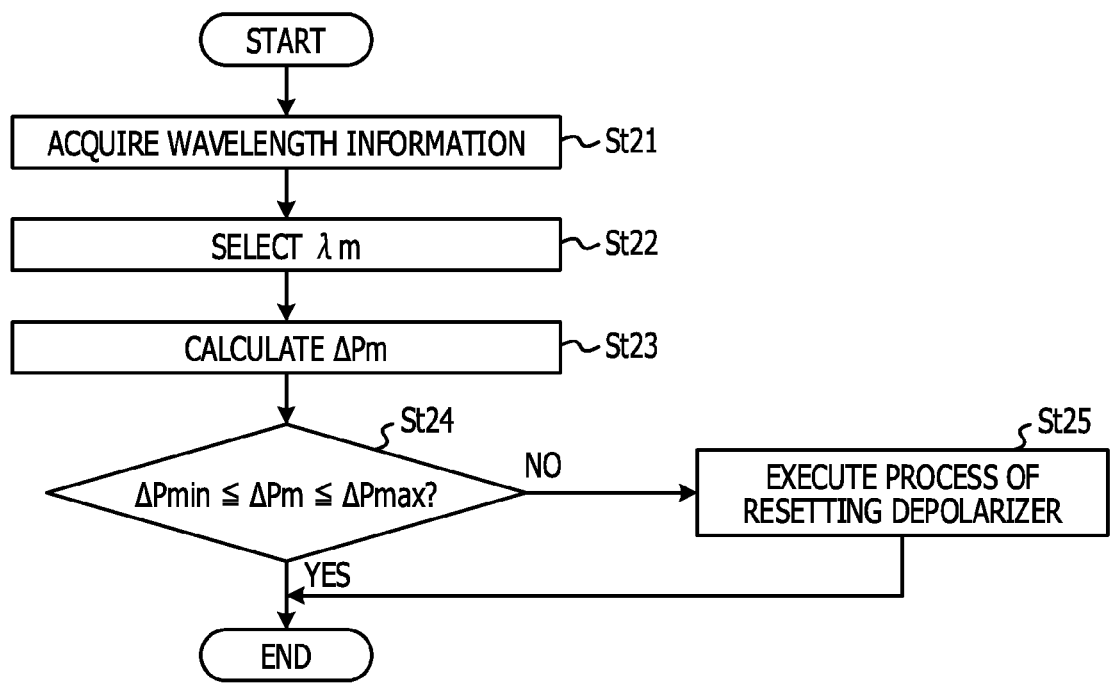
FIG. 7 is a flowchart of an example of operations of a Raman amplifier when an optical signal is added.

FIG. 7 is a flowchart of an example of operations of the Raman amplifier 1 in the case where the optical signal is added. First, the calculating circuit 170 or 170a acquires wavelength information on a wavelength λm added to the polarized multiplexed optical signal S from, for example, the network management device (in step St21). The acquired wavelength information is recorded in the memory 171, for example.

Next, the filter 160 or the optical switch 6 selects the added wavelength λm in accordance with an instruction from the calculating circuit 170 or 170a (in step St22). Next, the calculating circuit 170 or 170a calculates the difference ΔPm between the power of polarized light components multiplexed into the optical signal with the added wavelength λm (in step St23). The calculation of the difference ΔPm between the power is executed in the same manner as steps St5 and 6 illustrated in FIG. 6.

Next, the calculating circuit 170 or 170a determines whether or not the difference ΔPm between the power is equal to or larger than the minimum value ΔPmin among the differences ΔPi between the power of the polarized light components for the setting of the adjusted depolarizer 13 and equal to or smaller than the maximum value ΔPmax among the differences ΔPi between the power of the polarized light components for the setting of the adjusted depolarizer 13 (in step St24). If an inequality of ΔPmin≤ΔPm≤ΔPmax is satisfied (Yes in step St24), it is determined that an effect of the addition of the new optical signal on characteristics of the polarized multiplexed optical signal S is small, and the calculating circuit 170 or 170a terminates the process so as to ensure that the setting of the depolarizer 13 is maintained.

On the other hand, if the inequality of ΔPmin≤ΔPm≤ΔPmax is not satisfied (No in step St24), it is determined that the effect of the addition of the new optical signal on the characteristics of the polarized multiplexed optical signal S is large and the calculating circuit 170 or 170a executes the process (process that is the same as FIG. 6) of resetting the depolarizer 13 (in step St25) and terminates the process. The Raman amplifier 1 operates in the aforementioned manner when the optical signal is added.

In the aforementioned manner, the Raman amplifier 1 determines whether or not the process of resetting the polarizer 13 is to be executed, based on whether or not the inequality of ΔPmin≤ΔPm≤ΔPmax is satisfied. Thus, when the optical signal is newly added to the polarized multiplexed optical signal S, the Raman amplifier 1 may execute the process of resetting the depolarizer 13 based on the effect on the characteristics of the polarized multiplexed optical signal S. If an optical signal is removed from the polarized multiplexed optical signal S, the process of resetting the depolarizer 13 may not be executed.

In addition, the process of resetting the depolarizer 13 is executed when the transmission path F is switched from an active system to a standby system by a switch or when the many wavelengths λ1 to λn of the optical signals are changed by a wavelength selective switch (WSS) in a transmitting node or a relaying node. In this case, the receiving device immediately transitions to an operating state, and the setting of the state of the depolarizer 13 is changed to a state close to the current state in order to avoid an adverse effect of a variation in the power of the polarized multiplexed optical signal S on the quality of communication.

As described above, the amplifying device (Raman amplifier) 1 according to each of the embodiments includes the light sources (excitation light sources) 10a to 10d, the depolarizer 13, the amplifier (second wavelength multiplexer) 14, the measurer 16 or 16a, and the adjuster 17 or 17a. The light sources (excitation light sources) 10a to 10d output the excitation light L. The depolarizer 13 changes the degree of the polarization of the excitation light L in accordance with the setting of the depolarizer 13. The amplifier 14 executes the Raman amplification so as to amplify the polarized multiplexed optical signal S by the excitation light L of which the degree of the polarization has been changed by the depolarizer 13.

The measurer 16 or 16a measures the power Pp and Ps of the polarized light components (P waves and S waves) multiplexed into the polarized multiplexed optical signal S amplified by the excitation light L. The adjuster 17 or 17a calculates the differences ΔPi between the power Pp and Ps of the polarized light components and adjusts the setting of the depolarizer 13 so as to reduce the differences ΔPi between the power Pp and Ps of the polarized light components.

According to the aforementioned configuration, in the amplifier 14, the polarized multiplexed optical signal S is subjected to the Raman amplification and thereby amplified by the excitation light L of which the degree of the polarization has been changed by the depolarizer 13. The setting of the depolarizer 13 is adjusted so as to ensure that the differences ΔPi between the power Pp and Ps of the polarized light components of the polarized multiplexed optical signal S are reduced. Thus, the degree of the polarization of the excitation light L is sufficiently reduced and the quality of communication is improved.

The receiving device according to each of the embodiments includes the light sources (excitation light sources) 10a to 10d, the depolarizer 13, the amplifier (second wavelength multiplexer) 14, the receivers (receivers) 4, the measurer 16 or 16a, and the adjuster 17 or 17a. The light sources (excitation light sources) 10a to 10d output the excitation light L. The depolarizer 13 changes the degree of the polarization of the excitation light L in accordance with the setting of the depolarizer 13. The amplifier 14 executes the Raman amplification so as to amplify the polarized multiplexed optical signal S by the excitation light L of which the degree of the polarization has been changed by the depolarizer 13. The receivers 4 receive the polarized multiplexed optical signal S subjected to the Raman amplification and thereby amplified by the excitation light L.

The measurer 16 or 16a measures the power Pp and Ps of the plurality of polarized light components (P waves and S waves) multiplexed into the polarized multiplexed optical signal S subjected to the Raman amplification and amplified by the excitation light L. The adjuster 17 or 17a calculates the differences ΔPi between the power Pp and Ps of the plurality of polarized light components and adjusts the setting of the depolarizer 13 so as to reduce the differences ΔPi between the power Pp and Ps of the plurality of polarized light components.

The receiving device according to each of the embodiments includes the same configuration as the aforementioned amplifying device 1 and produces the same effect as the aforementioned details.

In addition, the amplification method according to each of the embodiments includes the following processes.

(1) The process of outputting the excitation light L from the light sources (excitation light sources) 10a to 10d (2) The process of changing the degree of the polarization of the excitation light L by the depolarizer 13 in accordance with the setting of the depolarizer 13

(3) The process of executing the Raman amplification so as to amplify the polarized multiplexed optical signal S by the excitation light L of which the degree of the polarization has been changed by the depolarizer 13

(4) The process of measuring the power Pp and Ps of the plurality of polarized light components multiplexed into the polarized multiplexed optical signal S subjected to the Raman amplification and amplified by the excitation light L (5) The process of calculating the differences between the power Pp and Ps of the plurality of polarized light components (6) The process of adjusting the setting of the depolarizer 13 based on the differences ΔPi between the power Pp and Ps of the plurality of polarized light components The amplification method according to each of the embodiments uses the same configuration as the aforementioned amplifying device 1 and produces the same effect as the aforementioned details.

The aforementioned embodiments are preferred embodiments and not limited to them and may be variously modified and changed without departing from the gist of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An amplifying device comprising:
   a light source configured to output excitation light;
   a depolarizer configured to change a degree of polarization of the excitation light in accordance with a setting;
   an amplifier configured to execute Raman amplification so as to amplify a polarized multiplexed optical signal by the excitation light of which the degree of the polarization has been changed by the depolarizer;
   a measurer configured to measure the power of a plurality of polarized light components multiplexed into the polarized multiplexed optical signal subjected to the Raman amplification and amplified by the excitation light; and
   an adjuster configured to calculate differences between the power of the plurality of polarized light components and adjust the setting of the depolarizer so as to reduce the differences between the power of the plurality of polarized light components.

2. The amplifying device according to claim 1,
   wherein the polarized multiplexed optical signal includes a plurality of optical signals with different wavelengths,
   wherein the measurer measures the power of the plurality of polarized light components multiplexed into the plurality of optical signals,
   wherein the adjuster calculates the average of the differences between the power of the plurality of polarized light components multiplexed into the plurality of optical signals and adjusts the setting of the depolarizer so as to ensure that the average is minimal.

3. The amplifying device according to claim 2,
wherein when a new optical signal with a wavelength different from the plurality of optical signals is added to the polarized multiplexed optical signal after the adjuster adjusts the setting of the depolarizer, the measurer measures the power of a plurality of polarized light components multiplexed into the new optical signal, and
wherein the adjuster calculates a difference between the power of the plurality of polarized light components multiplexed into the new optical signal and readjusts the setting of the depolarizer if the difference between the power of the plurality of polarized light components multiplexed into the new optical signal is not in a range between the minimum and maximum values among the differences between the power of the plurality of polarized light components multiplexed into the plurality of optical signals for the adjusted setting of the depolarizer.

4. A receiving device comprising:
a light source configured to output excitation light;
a depolarizer configured to change a degree of polarization of the excitation light in accordance with a setting;
an amplifier configured to execute Raman amplification so as to amplify a polarized multiplexed optical signal by the excitation light of which the degree of the polarization has been changed by the depolarizer;
a receiver configured to receive the polarized multiplexed optical signal subjected to the Raman amplification and amplified by the excitation light;
a measurer configured to measure the power of a plurality of polarized light components multiplexed into the polarized multiplexed optical signal subjected to the Raman amplification and amplified by the excitation light; and
an adjuster configured to calculate differences between the power of the plurality of polarized light components and adjust the setting of the depolarizer based on the differences between the power of the plurality of polarized light components.

5. The receiving device according to claim 4,
wherein the polarized multiplexed optical signal includes a plurality of optical signals with different wavelengths,
wherein the measurer measures the power of the plurality of polarized light components multiplexed into the plurality of optical signals, and
wherein the adjuster calculates the average of the differences between the power of the plurality of polarized light components multiplexed into the plurality of optical signals and adjusts the setting of the depolarizer so as to ensure that the average is minimal.

6. The receiving device according to claim 5,
wherein when a new optical signal with a wavelength different from the plurality of optical signals is added to the polarized multiplexed optical signal after the adjuster adjusts the setting of the depolarizer, the measurer measures the power of a plurality of polarized light components multiplexed into the new optical signal, and
wherein the adjuster calculates a difference between the power of the plurality of polarized light components multiplexed into the new optical signal and readjusts the setting of the depolarizer if the difference between the power of the plurality of polarized light components multiplexed into the new optical signal is not in a range between the minimum and maximum values among the differences between the power of the plurality of polarized light components multiplexed into the plurality of optical signals for the adjusted setting of the depolarizer.

7. The receiving device according to claim 4, further comprising
an optical amplifier configured to further amplify the polarized multiplexed optical signal subjected to the Raman amplification,
wherein the measurer measures the power of the plurality of polarized light components multiplexed into the polarized multiplexed optical signal amplified by the optical amplifier.

8. An amplification method comprising:
outputting excitation light from a light source;
changing a degree of polarization of the excitation light by a depolarizer in accordance with a setting;
executing Raman amplification so as to amplify a polarized multiplexed optical signal by the excitation light of which the degree of the polarization has been changed by the depolarizer;
measuring the power of a plurality of polarized light components multiplexed into the polarized multiplexed optical signal subjected to the Raman amplification and amplified by the excitation light;
calculating differences between the power of the plurality of polarized light components; and
adjusting the setting of the depolarizer based on the differences between the power of the plurality of polarized light components.

9. The amplification method according to claim 8, further comprising:
measuring the power of the plurality of polarized light components multiplexed into a plurality of optical signals included in the polarized multiplexed optical signal and having difference wavelengths; and
calculating the average of the differences between the power of the plurality of polarized light components multiplexed into the plurality of optical signals and adjusting the setting of the depolarizer so as to ensure that the average is minimal.

10. The amplification method according to claim 9, further comprising:
measuring, when a new optical signal with a wavelength different from the plurality of optical signals is added to the polarized multiplexed optical signal after the setting of the depolarizer is adjusted, the power of a plurality of polarized light components multiplexed into the new optical signal; and
calculating a difference between the power of the plurality of polarized light components multiplexed into the new optical signal and readjusting the setting of the depolarizer if the difference between the power of the plurality of polarized light components multiplexed into the new optical signal is not in a range between the minimum and maximum values among the differences between the power of the plurality of polarized light components multiplexed into the plurality of optical signals for the adjusted setting of the depolarizer.

11. The amplifying device according to claim 1, wherein the amplifier is configured to execute backward Raman amplification with the excitation light and the polarized multiplexed optical signal travelling in opposite directions to each other.

12. The receiving device according to claim 4, wherein the amplifier is configured to execute backward Raman amplification with the excitation light and the polarized multiplexed optical signal travelling in opposite directions to each other.

\* \* \* \* \*